(12) United States Patent
Waide

(10) Patent No.: US 7,500,935 B2
(45) Date of Patent: Mar. 10, 2009

(54) LIGHTWEIGHT REDUCTION GEARBOX

(75) Inventor: William Martin Waide, Adelanto, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 377 days.

(21) Appl. No.: 11/473,969

(22) Filed: Jun. 23, 2006

(65) Prior Publication Data

US 2007/0219044 A1 Sep. 20, 2007

Related U.S. Application Data

(60) Provisional application No. 60/694,024, filed on Jun. 23, 2005.

(51) Int. Cl.
F16H 57/08 (2006.01)
(52) U.S. Cl. .................................................. 475/336
(58) Field of Classification Search ................ 475/346, 475/347, 331, 338, 336
See application file for complete search history.

(56) References Cited

U.S. PATENT DOCUMENTS

| | | | | |
|---|---|---|---|---|
| 676,234 A * | 6/1901 | Humpage et al. | ........... | 475/306 |
| 1,499,763 A * | 7/1924 | Davis | ......................... | 475/336 |
| 1,761,308 A * | 6/1930 | Morgan | ...................... | 475/308 |
| 1,902,374 A * | 3/1933 | Pirinoli | ....................... | 475/332 |
| 2,095,794 A * | 10/1937 | Corbin | ........................ | 475/338 |
| 3,144,790 A * | 8/1964 | Davis, Jr. et al. | ............ | 475/338 |
| 3,871,248 A | 3/1975 | Barish | | |
| 4,043,216 A * | 8/1977 | Steer | ........................... | 74/410 |
| 4,489,625 A | 12/1984 | White | | |
| 4,660,437 A * | 4/1987 | Scott | ............................ | 475/5 |
| 4,680,985 A * | 7/1987 | Troester | ........................ | 475/3 |
| 4,682,512 A | 7/1987 | Peterson | | |
| 5,135,442 A | 8/1992 | Bossler, Jr. | | |
| 5,152,668 A * | 10/1992 | Bulman et al. | .............. | 416/129 |
| 5,154,372 A * | 10/1992 | Hora et al. | ..................... | 244/62 |
| 5,807,202 A | 9/1998 | Sammataro | | |
| 5,910,066 A * | 6/1999 | Schulz et al. | ............... | 475/336 |
| 6,220,984 B1* | 4/2001 | Schulz et al. | ............... | 475/340 |
| 6,428,443 B1* | 8/2002 | Dischler | ..................... | 475/343 |
| 6,790,156 B2* | 9/2004 | Hosle | .......................... | 475/331 |
| 6,931,959 B2* | 8/2005 | Giuriati | ........................ | 74/413 |
| 7,008,348 B2* | 3/2006 | LaBath | ........................ | 475/338 |

* cited by examiner

*Primary Examiner*—Dirk Wright
(74) *Attorney, Agent, or Firm*—Fish & Associates, PC

(57) ABSTRACT

Contemplated gearboxes combine a high numerical reduction ratio with the capability of transmitting power at a superior power-to-weight ratio using a compound star planetary gearbox configuration that is radially expanded using hollow driveshafts to link the planet gears. In most preferred compound planetary gear arrangements, planets of different diameter are torsionally connected to each other, or mesh with each other. Input and output gears counter-rotate while the planets rotate in bearings anchored to a static casing.

22 Claims, 7 Drawing Sheets

LIGHTWEIGHT REDUCTION GEARBOX

This application claims the benefit of our U.S. provisional patent application with the Ser. No. 60/694,024, which was filed Jun. 23, 2005.

FIELD OF THE INVENTION

The field of the invention relates to the transmission of power by gears.

BACKGROUND OF THE INVENTION

When gas turbine or turboshaft engines are employed to drive a plant, machinery, or a vehicle, a high numerical reduction ratio is frequently needed because of the output speed of the turbine. In addition, power transmission of several thousands of horsepower is encountered in many applications. In the case of a stationary plant, or for marine applications, mechanical reliability can be readily achieved if the weight of the gearbox is not important. However, with propeller drives for aircraft or rotor drives for helicopters, weight of the gearbox is critically important. This requirement led to the widespread adoption of planetary or epicyclic gearboxes in flight applications. Planetary gearboxes achieve their weight advantage over simple gear trains of the same ratio by virtue of increasing the number of mesh points, and hence load-carrying gear engagements, in a given circumferential length of gearing.

With increasing scale and power transmission capacity, the weight of a gearbox increases approximately as a cube function of linear size because the steel elements of the gears span the entire radial distance from the center of rotation to the periphery of the largest gear, usually a ring gear. The tangential force resisting a torque is inversely proportional to the distance from the center of rotation, thus it is clear that whilst gear tooth loading from tangential force decreases with radius, weight increases disproportionately.

Efforts to improve the weight to torque/speed ratio are illustrated by the trend lines for the world population of aircraft and rotorcraft gearboxes in FIG. 10, in which weight on the vertical axis is plotted against a torque-speed equation on the horizontal axis. Here, the data were taken from approximately 70 different helicopters for a linear fit and included transmissions, rotor shaft(s), lubrication, and rotor brake. When corrected by a calendar year 'technology factor', the trend lines are remarkably linear (the technology factor takes into account the material, manufacturing, and lubricant improvements over a time span). For example, the top line in the graph of FIG. 10 is the trend for 1980 technology, while the middle line represents the corresponding trendline at a time 10 years later (i.e., for the year 2000 technology). A projected trendline for the year 2010 is depicted as the bottom line in FIG. 10. Therefore, desirable gearboxes will advantageously be situated below the 2000, and more preferably below the 2010 trendline with respect to their weight to torque/speed ratio. The performance of an aircraft, equipped with such gearbox, will therefore benefit by increased range or payload from the reduction of the empty weight fraction achieved by a lighter gear box arrangement.

Therefore, it should be readily apparent that the problem of gearbox specific weight per horsepower constantly recurs in aircraft designs and hence requires a solution. Consequently, there is still a need to provide improved gearboxes, and especially light-weight gearboxes for airplanes and other weight-critical uses.

SUMMARY OF THE INVENTION

The inventive subject matter provides devices and methods in which gearboxes combine a high numerical reduction ratio with the capability of transmitting power at a power-to-weight ratio previously unattainable with existing designs. A significant advantage is that such devices and methods lessen the importance of compactness or space savings.

These objectives are achieved with a compound star planetary gearbox which is radially expanded by using hollow driveshafts to link the planet gears. A compound planetary gear arrangement is defined as one where planets of different diameter are torsionally connected to each other, or mesh with each other. The star arrangement refers to the fact that the input and output gears (the sun and ring gear respectively) counter-rotate while the planets rotate in bearings anchored to a static casing. This distinction between star and conventional planetary sets is important as the described approach is based on the principle of radially expanding the planets and supporting them by bearings in machine structure. In contrast, in heretofore known planetary gear arrangements, the planet axes are parallel to the input and output shafts and the planet gear pairs are co-joined or made of common material.

In the contemplated methods and devices, the planet axes are disposed radially outwards at an angle to the common axis of the input and output shafts, and the individual planet gears are separated by a distance and connected by tubular shafting. The torque carrying capacity of thin wall, tubular, high-strength materials is well known. Torque, and hence the tangential force applied to the ring gear (the output), is transferred to a large radius by means of the radially-located tubular shafts. The result is a high numerical ratio between the small diameter planets and the large ring gear. This large ring gear can be configured with the teeth on the inside or outside of the ring. In either case the result is very high power transmission capacity because of the large radius of application of relatively modest tangential forces.

This arrangement is especially suited to the driving of large propellers for turboshaft aircraft, or the rotors of large helicopters, because the space or volume constrains are of lesser importance than the weight of the assembled unit. A full assembly consists of a dividing gear set, which is the sun gear and first planets of the compound planet arrangement, and a combining gearbox which consists of the second planets and the output ring gear. In small scale, the dividing and combining gearbox sections and the interconnecting shafts could be co-located in a single housing, but in large scale aircraft or helicopters the separation of the two basic assemblies provides further advantages regarding immunity to structural deflections, drive redundancy, damage tolerance, access improvement, serviceability and weight reduction which are further discussed in detail.

Various objects, features, aspects and advantages of the present invention will become more apparent from the following detailed description of preferred embodiments of the invention.

DETAILED DESCRIPTION

In the figures, the input sun gear is a parallel pinion, axially and radially located at a point remote from the operating plane of the pinion, but with angular freedom such that the pinion can occupy the precise position whereby it is in balance between the tooth contact forces.

Figure 1:
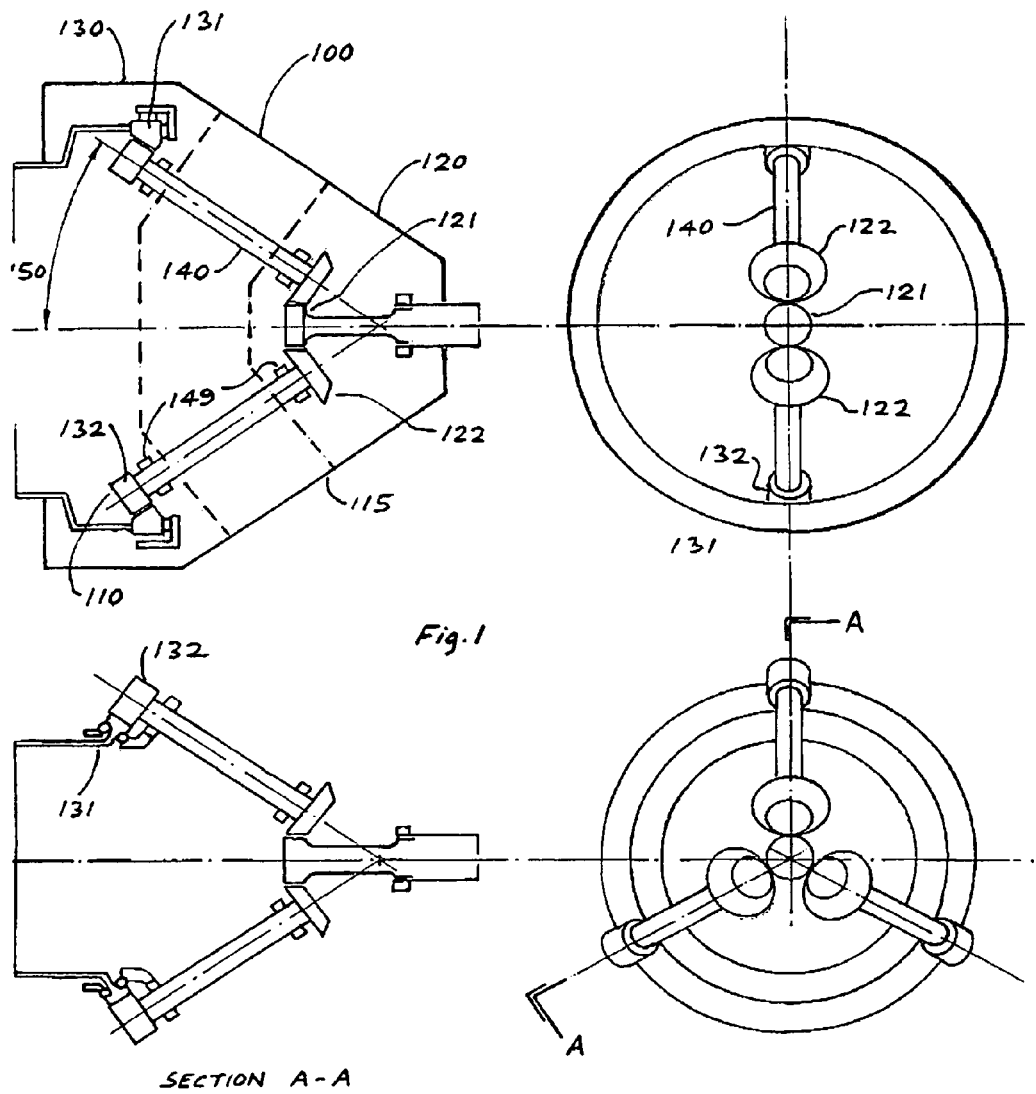
FIG. 1 is a schematic of arrangements with two (or alternatively three) distributing shafts and two (or alternatively three) pinions, and either an internally- or externally-toothed ring gear.

In FIG. 1, a reduction gearbox 100 generally comprises a radially expanded compound planetary gear set 110 in a casing 115, that has a distributor portion 120 and a combining portion 130. The distributor portion 120 generally comprises a sun gear 121 and several planet gears 122. The combining portion 130 generally comprises a driven ring gear 131 a further set of driving pinions 132. Connecting the distributor portion 120 and the combining portion 130 is an arrangement of multiple shafts 140 held in bearings 149.

Inclination 150 of the connecting shafts 140 relative to the principal axis of an input is a design choice. A larger angle (>45 deg.) results in relatively short assembly, however, this also provides relatively unfavorable gear proportions. Conversely, a shallow angle of inclination lengthens the gearbox, but provides relatively more favorable gear proportions. The same is true of the embodiment in FIG. 2 below. Most preferably, the axes of rotation are fixed relative to the casing.

Figure 2:
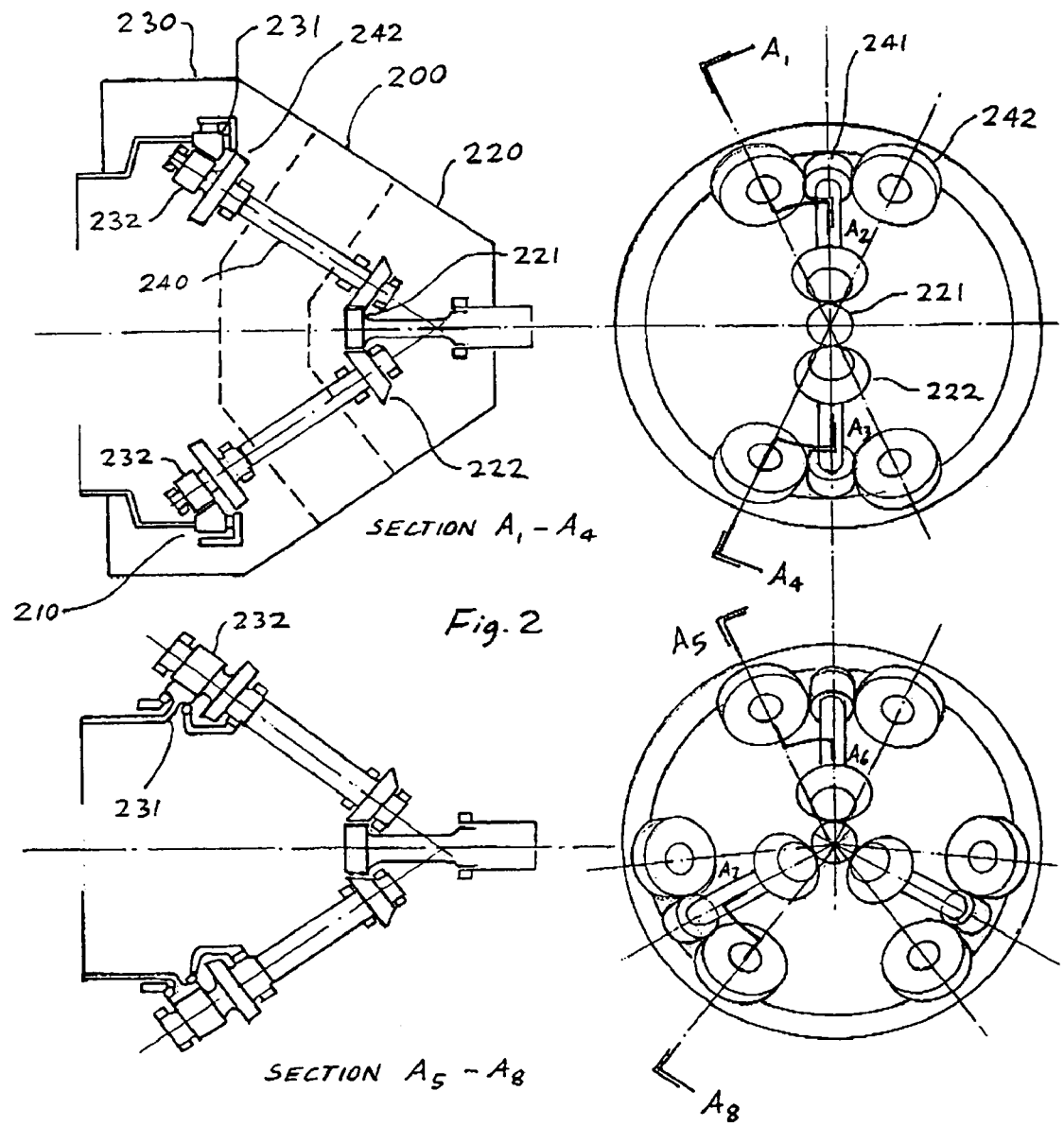
FIG. 2 is a schematic of arrangements with two and three distributing shafts, and four and six compounded pinions, and either an internally- or externally-toothed ring.

FIG. 2 shows an embodiment of a gearbox 200 having a further division of torque by arranging two output planets 242 per drive shaft 240. By analogy with elements of FIG. 1, the gearbox 200 generally comprises a radially expanded compound planetary gear set 210 that has a distributor portion 220 and a combining portion 230. The distributor portion 220 generally comprises a sun gear 221 and several planet gears 222. The combining portion 230 generally comprises a driven ring gear 231 a further set of driving planets 232. Connecting the distributor portion 220 and the combining portion 230 is an arrangement of multiple shafts 240. The arrangement in FIG. 2 uses the load sharing principle of one pinion 241 in force balance between two planets 242, and therefore the pinions 241 do not require bearing support.

Figure 3:
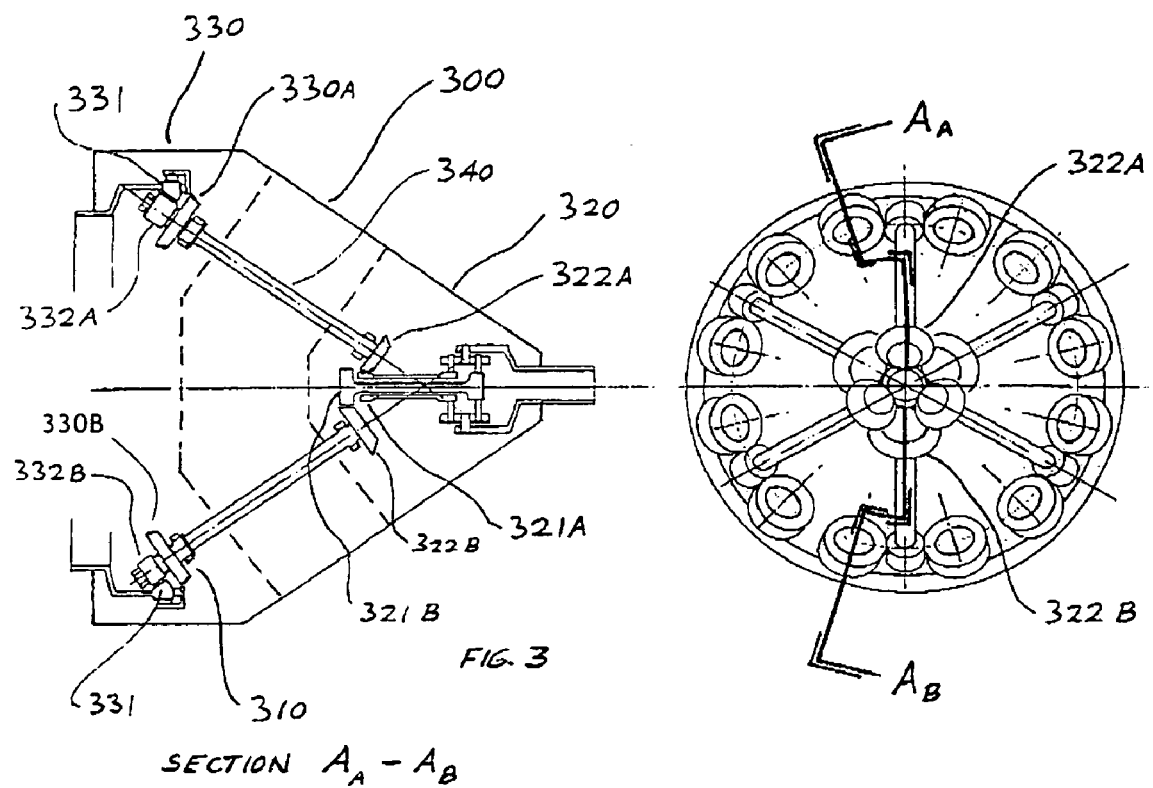
FIG. 3 is a schematic of an arrangement with a non-meshing torque divider between two input sun gears, six distributing shafts, and 12 compounded pinions.

In FIG. 3, a reduction gearbox 300 generally comprises a radially expanded compound planetary gear set 310 that has a distributor portion 320 and a combining portion 330. The distributor portion 320 generally comprises two sun gears 321A, 321B that mesh with a first set of several planet gears 322A, and a second set of planetary gear 322B, respectively. The combining portions are as shown in figure two, except the quantity is doubled. There is now a first combining portion 330A which generally comprises a driven ring gear 331 and driving planets 332A, and a second combining portion 330B which generally comprises the same driven ring gear 331 and driving planets 332B. Connecting the distributor portion 320 and the combining portion 330 is an arrangement of multiple shafts 340.

Those skilled in the art will, of course appreciate that the arrangements of FIGS. 1, 2, and 3 can be driven in reverse. Thus, instead of the gearbox being used to achieve a speed reduction, the gearbox could be used in reverse to achieve a speed increase. Speed increases, for example, can be useful in transferring energy from a low speed windmill to a high speed generator. It is still further generally preferred that the sun and ring gears are configured to achieve a multiplication of at least 10, more typically at least 30, and most typically at least 50.

Figure 4:
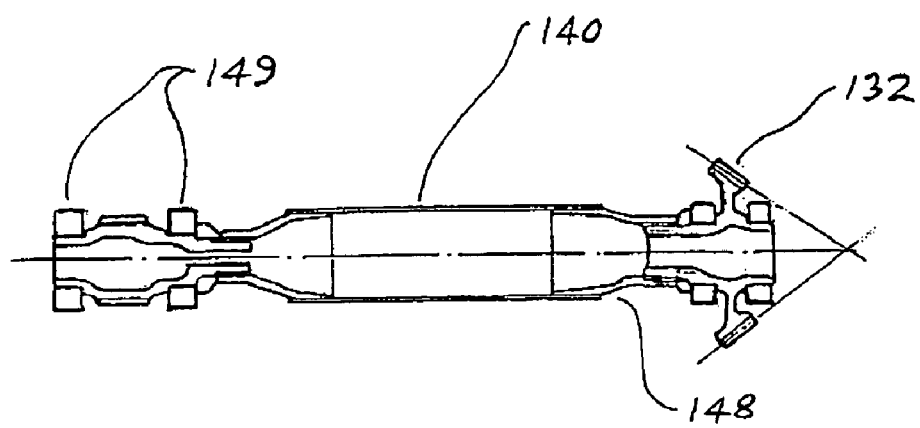
FIG. 4 is an axial cross-section of a single distributing shaft that would be used in accordance with the gearbox of FIG. 1.
Figure 5:
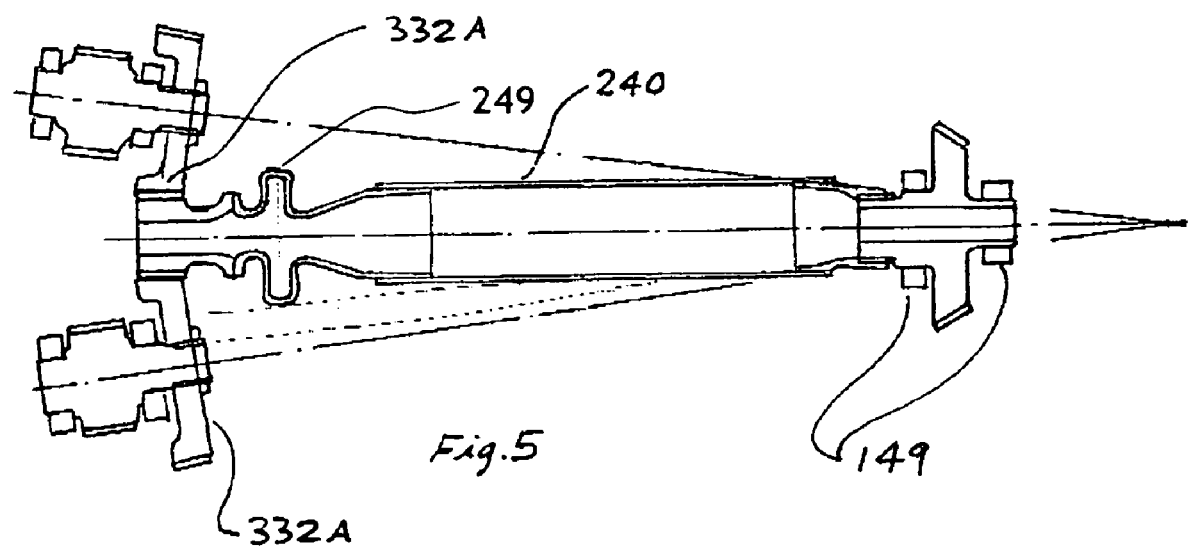
FIG. 5 is an axial cross-section of a single distributing shaft that would be used in accordance with the gearbox of FIG. 2.

Whereas gears and bearings are traditionally fabricated from high strength steel, the connecting shaft 140 in FIG. 4, is preferably constructed of a carbon fiber filament or tape with a resin binder, in a thin walled tubular configuration. Also shown are pinion bearings 149, and the driving planets 132. Interconnection member 148 is joins the tubular shaft 140 to driving pinion 132. The connecting shaft 240 of FIG. 5 is also advantageously comprised of a carbon fiber filament or tape with a resin binder, in a thin walled tubular configuration. Here, however, instead of pinion bearings at both ends, the shaft is mutually supported by the driven planetary gears 332A at one end, and pinion bearings 149 at the other end. In both FIGS. 4 and 5, the shaft length and other dimensions are determined by installation requirements, and is also dependent upon the angle of inclination 150. Flexible bellows 249 allows gear 232 to adopt its force-balanced running position.

Figure 6:
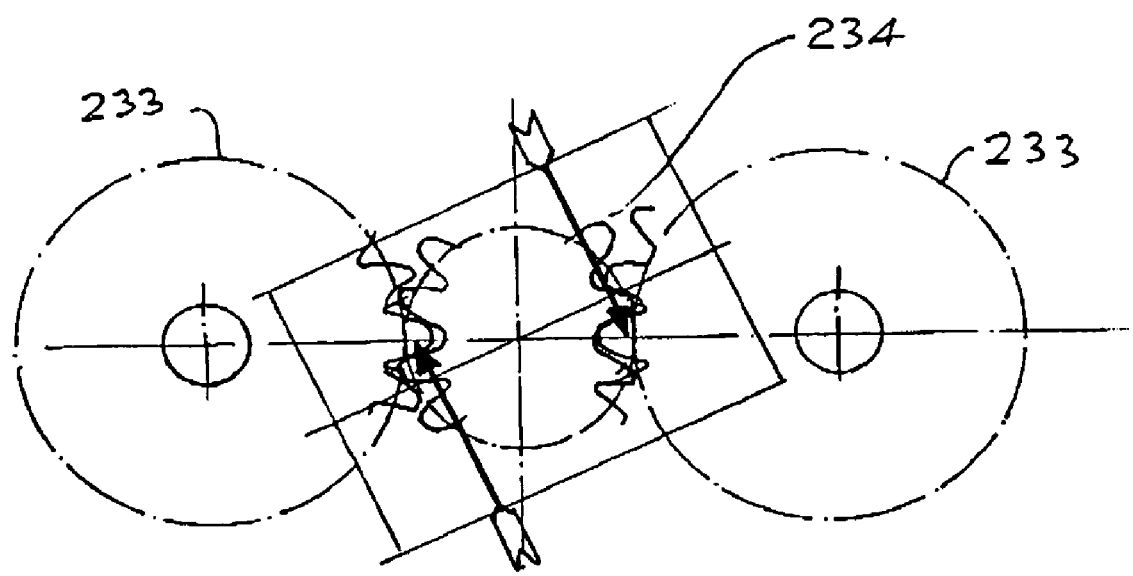
FIG. 6 is an axial view showing the driving planet of FIG. 2 in force balance between two driven face gears.

In FIG. 6, an end of a driving planet 234 is shown meshing with driven face gears (planets) 233 and is in force balance. The face gears 233 are preferably identical to each other to equally divide the torque.

Figure 7:
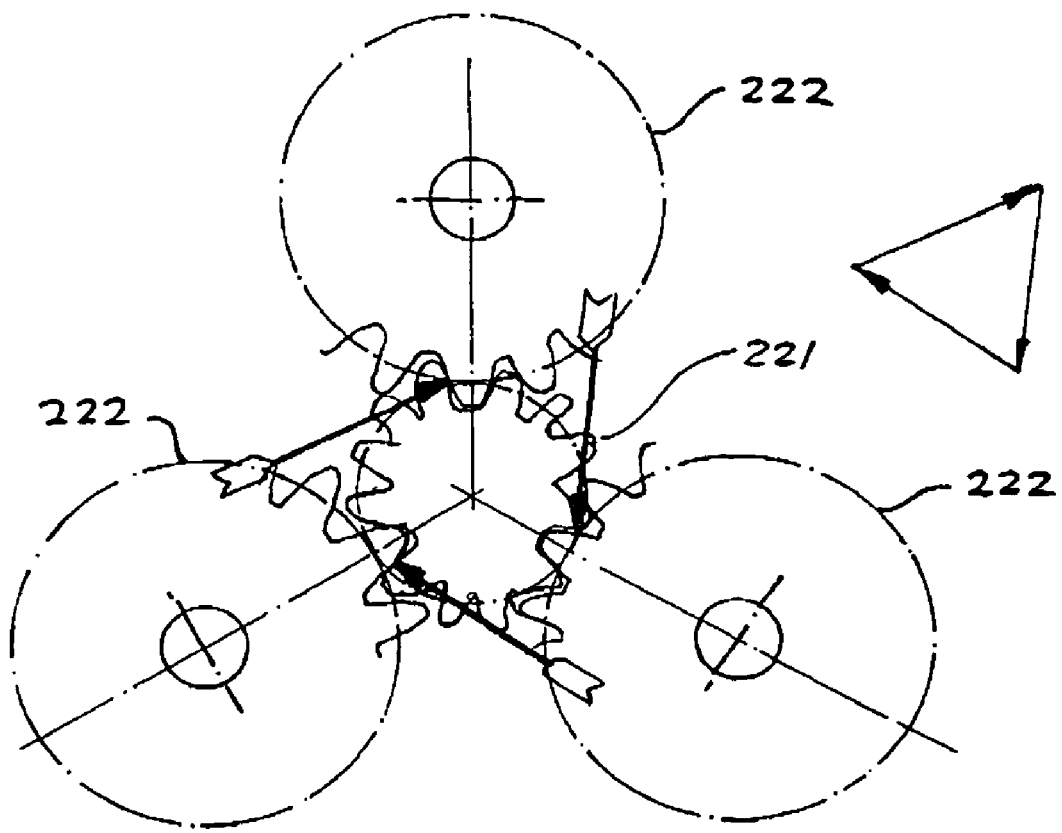
FIG. 7 is an axial view showing the driving sun gear of FIG. 2 in force balance among three driven face gears.

In FIG. 7, an end of a driving sun gear 221 is shown meshing with three driven face gears (planets) 222 and is in force balance. Here again, the face gears 222 are preferably identical to each other to equally divide the torque.

Figure 8:
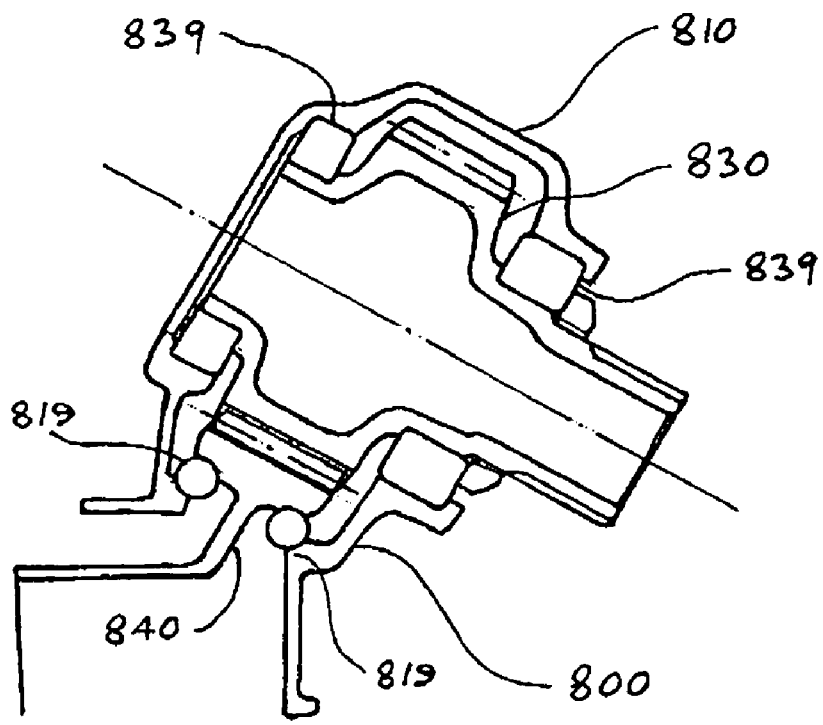
FIG. 8 is a cross-section of the mutual support bearing arrangement between the output pinion and the output ring gear.

In FIG. 8, a bearing connection arrangement 800 generally comprises a caliper 810, a pinion 830, pinion bearings 839, a ring gear 840, and ring gear bearings 819. Those skilled in the art will appreciate that the caliper 810 should provide a rigid connection between the bearings 839 and 819. In other respects, namely the relationship between the dividing and combining portions, this is a deflection-tolerant gearbox.

Figure 9:
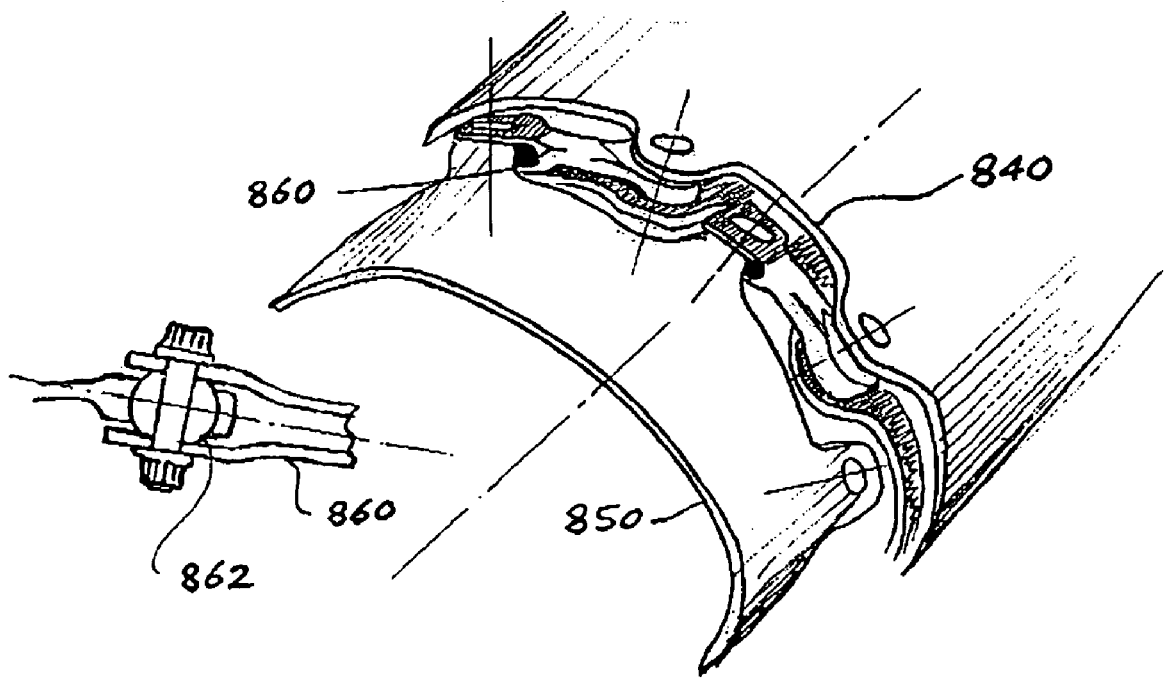
FIG. 9 is a partial perspective end view of a possible connection between an output ring gear and the load (or input device) consisting of a series of tangential links.

In FIG. 9, output ring gear 840 is coupled to the load (or input device) 850 by a series of links 860. Links ends preferably comprise compliant connections allowing angular deflection to occur between members 850 and 860. As is commonly configured with flexible links, links 860 are preferably terminated with an integral clevis connected to ball 862. Flexibility in the connection is advantageous because it isolates the torque from any externally applied forces.

Meshing with the input sun gear are three face gears, otherwise referred to as the first compound planet gears. These are supported in bearings mounted in gearcase structure, and are connected to radial driveshafts, which are preferably of tubular construction. The radially-outboard end of the driveshaft is connected to a further parallel pinion, referred to as the second compound planet gear. This either drives the ring gear directly, (FIG. 1) in which case the pinion is supported in bearings, or, drives the ring gear through further compounding using two face gears and two further pinions. (FIG. 2) In such arrangement, the second compound pinion is free to occupy the precise position whereby it is in force balance. The driveshafts, which are intended to run in a dry environment in the larger scale gearboxes, operate within containment tubes designed to protect the shafts from outside impact events, or minimize collateral damage in the event of shaft failure.

The large-diameter ring gear, being conical, is a face gear and because it is internally toothed, produces a mesh geometry exhibiting a high contact ratio which is beneficial for stress reduction. The ring gear rotates in an annular housing and is supported on rolling element bearings, or, in an alternative arrangement, rotates in plain bearings. The stationary housing is mounted on and reacts torque to the machine structure. The output drive is transmitted from the ring gear to the load by multiple points of connection, preferably at a large radius from the center of rotation in order to minimize tangential forces. It will be seen from FIG. 1-3 that the output ring gear is a true annulus, which allows structure or other machine elements, to pass through the center. The gear lubricating oil is contained using lip seals, contacting both the internal and external surfaces of the annular gear.

As the gearbox size and transmitted power increase, the number of driveshafts is likely to increase from three to six, with two input sun gears being employed, the first with three first compound planets arranged symmetrically at 120 Deg. intervals and the second similar arrangement displaced 60 Deg. to the first so the driveshafts are positioned with operating clearance from the rims of the first planet gears (FIG. 3). Note that the axes of all radial shafts converge at the same intersection point on the input/output center line of rotation. This geometry is beneficial in that it allows a set of identical combining gear arrangements at the ring gear perimeter housing with consequent common components and dimensions.

A feature common to all preferred embodiments is that input torque is distributed to and divided equally between the final pinion-to-ring gear mesh points. This allows accurate prediction of the gear and bearing loading cases with subsequent confidence in the life and reliability calculations.

Another feature of great importance when the design is integrated into lightweight aircraft structure is the gearbox tolerance to load-induced deflections. It will be seen from FIG. 1-3 that the distributing and combining sections of the arrangement are independently sealed, separately-mounted, rigid sub-assemblies containing independent lubrication supplies. This is important when considering the redundancy opportunities, the fail-operational characteristics and tolerance to damage from ballistic impact.

FIG. 3 shows a particular feature providing drive redundancy. The non-meshing torque divider will provide free balance of power between both input sun gears, yet if drive is lost in one "branch" of the connected system such as would be caused by a shaft, gear or bearing failure or by externally-caused damage, the divider locks into one of two end default positions and drive through the active branch is maintained.

The diverging driveshafts each occupy a radial locus on the surface of a cone whose angle to the input/output centerline lies between a shallow and steep limit of approximately 20 and 50 Deg. respectively. If shallow, the driveshafts are long and heavier, but the face gears can alternatively be built with more face width (for more torque capacity) or less ratio (for higher speed and hence lighter driveshafts). If the cone angle is steep, the overall dimensions of the transmission are reduced, but the gear face decreases and the pinion/face gear pairs have to be run with more ratio in order to mesh correctly, thus slowing down the driveshafts and increasing their weight. These variables can be adjusted by mathematical analysis to produce a balanced design with optimum power to weight performance.

High strength tubular driveshafts constructed in composite materials offer an optimum torque-to-weight relationship. Because these lightweight members are the torque transfer medium to the large diameter ring gear, the steel content of the overall gearbox components, when expressed against outside dimensions and torque capacity, is much reduced compared with prior-art planetary and load-sharing gearboxes. This result has useful life and reliability implications. Some of the potential weight saving can be re-invested in the actual gear tooth sections and face widths and in the bearing proportions, reducing the loads and extending the gearbox life. This gearbox configuration would therefore find application in man-rated aircraft and helicopter applications, where extreme reliability is called for. The table below indicates the expected correlation between ring gear diameter and torque in contemplated devices and methods, wherein the devices will consistently and reliably transfer torque. In low-torque devices (e.g., unmanned aircraft), it is generally contemplated that torque is less than 5,000 ft-lb, while in manned aircraft, torque is preferably at least 50,000, more preferably at least 100,000, and in some cases even more than 500,000 ft-lb.

| torque (ft-lb) | 5000 | 50,000 | 100,000 | 500,000 |
| --- | --- | --- | --- | --- |
| ring gear dia. (in) | 12 | 30 | 45 | 68 |

Figure 10:
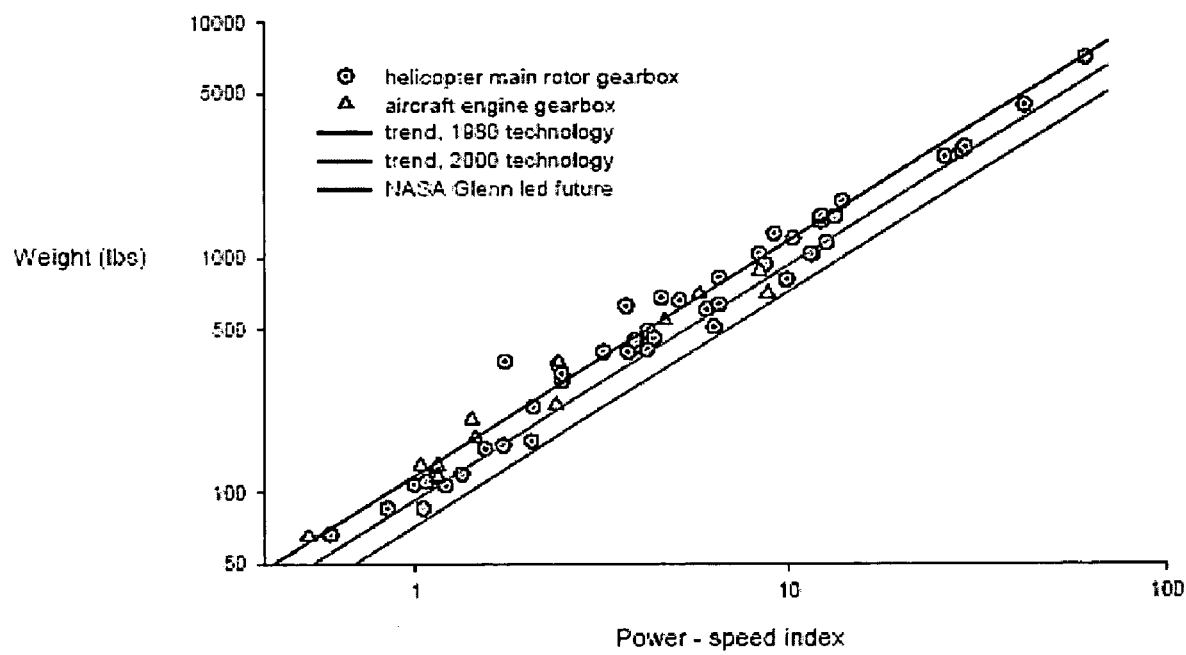
FIG. 10 is a graph depicting trendlines for weight to torque/speed ratio for various time periods.

Therefore, it should be appreciated that various advantages of contemplated devices and methods are achieved by radially expanding a compound star planetary gearbox by extending the torque-carrying connection between the planet gears. Moreover, by separating the dividing and combining elements of the gearbox, deflection-tolerance can be substantially improved. Still further, it should be appreciated that dividing the power transmission paths provides redundancy and hence fail-operational ability. In a yet further advantageous aspects, minimum-weight connection is achieved by attaching the driven load to the ring gear near gearbox outer diameter by multiple links. Using such and other torsionally stiff and weight efficient connections, the inventor calculated that contemplated devices exhibit a torque to weight ratio of greater than a projected 2010 parametric norm for lightweight high torque gearboxes (i.e., will be positioned below the bottom line of the graph in FIG. 10).

Thus, specific embodiments and applications of lightweight gearboxes, and especially light-weight reduction gearboxes have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A torque multiplier device, comprising:
   a sun gear and ring gear, coupled by a compound planetary set having at least first and second pinions with axes of rotation that are inclined relative to a principal axis of rotation of an input; and
   input and output planets disposed at opposite ends of a drive shaft.

2. The device of claim 1, wherein at least one of the pinion gears is held in a caliper.

3. The device of claim 2, wherein the planets rotate in bearings anchored to a static casing.

4. The device of claim 3, wherein the axes of rotation are fixed relative to a casing.

5. The device of claim 1, wherein the sizes of the sun and ring gears are such that they achieve a multiplication of at least 30.

6. The device of claim 1, wherein the sizes of the sun and ring gears are such that they achieve a multiplication of at least 50.

7. The device of claim 1, comprising a torsionally stiff and weight efficient connection such that the device exhibits a torque to weight ratio of greater than a 2010 parametric norm for lightweight high torque gearboxes.

8. The device of claim 1, wherein the size of the ring gear is selected to have a diameter effective for the device to consistently and reliably transfer at least 50,000 ft-lb of torque.

9. The device of claim 1, wherein the size of the ring gear is selected to have a diameter effective for the device to consistently and reliably transfer at least of 100,000 ft-lb of torque.

10. The device of claim 1, wherein the size of the ring gear is selected to have a diameter effective for the device to consistently and reliably transfer less than 5000 ft-lb of torque.

11. The device of claim 2, wherein each of the pinions includes a deflection accepting coupling.

12. The device of claim 11, wherein the deflection accepting coupling is selected from the group consisting of a shaped spline and a flexible bellows.

13. The device of claim 2, wherein the compound planetary set further comprises a third pinion.

14. The device of claim 13, wherein the first and second pinions are configured to continue operation upon catastrophic failure of the third pinion.

15. The device of claim 1, wherein at least one of the pinions has at least one end that is supported by an adjacent mesh without a need for bearing support.

16. A method of weight-efficiently multiplying torque comprising:
   increasing a radius of effort by at least 50% at a cost of increasing weight of a torque multiplier by no more than 50%; and
   increasing the radius of effort comprises using a first shaft that mates with a ring gear on one end of the shaft, and a sun gear on an opposite end of the shaft.

17. The method of claim 16, further comprising increasing the radius of effort by at least 100% at a cost of increasing weight by no more than 50%.

18. The method of claim 16, further comprising increasing the radius of effort by at least 100% at a cost of increasing weight by no more than 25%.

19. The method of claim 16, wherein the step of increasing the radius of effort comprises at least one of the shafts occupying a distance of at least 75% of a radius of the ring gear.

20. The method of claim 16, further comprising coupling the torque multiplier to a rotor of a rotorcraft.

21. The method of claim 16, wherein the step of increasing the radius of effort comprises using a shaft to couple a ring gear with a sun gear, wherein the shaft occupies a distance of at least 75% of a radius of the ring gear.

22. The method of claim 16, further comprising coupling the torque multiplier to a rotor of a rotorcraft.

* * * * *